(12) United States Patent
Liu

(10) Patent No.: US 7,190,929 B2
(45) Date of Patent: Mar. 13, 2007

(54) METHOD AND APPARATUS OF RAKE FINGER MANAGEMENT IN RAKE RECEIVER

(75) Inventor: Tai-Cheng Liu, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 549 days.

(21) Appl. No.: 10/388,675

(22) Filed: Mar. 13, 2003

(65) Prior Publication Data
US 2003/0176167 A1    Sep. 18, 2003

(30) Foreign Application Priority Data
Mar. 15, 2002    (TW) .............................. 91104996 A

(51) Int. Cl.
H04B 1/00 (2006.01)
H04B 15/00 (2006.01)
H04B 1/10 (2006.01)
H04B 1/18 (2006.01)

(52) U.S. Cl. .................... 455/63.1; 455/65; 455/281.7; 455/500; 455/506; 375/148; 375/147; 375/149

(58) Field of Classification Search ............... 455/63.1, 455/65, 281.7, 500, 506; 375/148, 147, 149
See application file for complete search history.

(56) References Cited

U.S. PATENT DOCUMENTS 6,078,611 A * 6/2000 La Rosa et al. ............ 375/147
6,345,078 B1 * 2/2002 Basso ......................... 375/349
6,377,614 B1 * 4/2002 Yamashita ................... 375/149
6,600,777 B1 * 7/2003 Glazko ........................ 375/148
6,795,411 B1 * 9/2004 Dino et al. .................. 455/522
6,813,309 B1 * 11/2004 Ogino ......................... 375/148
2002/0094018 A1 * 7/2002 Terao ......................... 375/147

* cited by examiner

*Primary Examiner*—Quochien B. Vuong
*Assistant Examiner*—Wen Huang
(74) *Attorney, Agent, or Firm*—Birch, Stewart, Kolasch & Birch, LLP

(57) ABSTRACT

The present invention is an assigning system and method for assigning a plurality of rake finger tracking units of a rake receiver in a Code Division Multiple Access (CDMA) communication system. The plurality of rake finger tracking units is used for tracking a plurality of path signal of each multipath signal by a plurality of corresponding predetermined tracking time positions. The assigning system and method estimate a plurality of corresponding tracking ranges of the plurality of path signals and compare the plurality of predetermined tracking time positions with the plurality of tracking ranges. If there is more than one predetermined tracking time positions in one tracking range, the assigning system assigns a rake finger tracking unit corresponding to one of the tracking time positions to track the path signal corresponding to the tracking range. If there is no predetermined tracking time position in the tracking range, the assigning system assigns an idle rake finger tracking unit to track the path signal corresponding to the tracking range. By the way, the present invention uses the rake finger tracking units of the rake receiver with the best efficiency to avoid the idle resources of the communication system.

19 Claims, 5 Drawing Sheets

METHOD AND APPARATUS OF RAKE FINGER MANAGEMENT IN RAKE RECEIVER

FIELD OF THE INVENTION

The present invention relates to a system for assigning a plurality of tracking units of a wireless receiver, and particularly, relates to a system for assigning a plurality of RAKE finger tracking units of a RAKE receiver.

BACKGROUND OF THE INVENTION

The spread spectrum CDMA communication system is popular in the recent years, wherein the RAKE receiver is proven to be the optimum choice for dealing with an external multipath signal in the CDMA communication system. FIG. 1 is a schematic diagram of a rake receiver 10 according to the prior art. The RAKE receiver 10 according to the prior art comprises a searcher 14, a plurality of RAKE finger tracking units 12a, 12b, 12c, a RAKE finger management 16 and a maximum ratio combiner 18. The three tracking units 12a, 12b, 12c, are utilized to simplify this case, however, more units can be accommodated.

When the RAKE receiver 10 receives an external multipath signal 13 from the antenna 11, the searcher 14 acquires the corresponding searching time position of the plurality of path signals 15, 17, 19 in the multipath signal 13 with a first predetermined resolution wherein the first predetermined revolution is 0.5 chip time. The objective of the searcher 14 is to identify the existence of the path signals 15, 17, 19, so we don't need a very exact resolution. If the first predetermined resolution were determined too precise, it would result in a huge rake receiver 10 and higher power consumption. The searcher 14 and the rake finger tracking units 12 need to match up with each other for the purpose of a small rake receiver, lower power consumption and exactly acquiring the time positions of path signals 15, 17, 19. Three of the plurality of the path signals are utilized to simplify this case, however, more units can be accommodated.

Every RAKE finger tracking units 12a, 12b, 12c aims to acquire the exact locations corresponding to the path signals, and each tracks a single path signal. Therefore, each of the RAKE finger tracking unit 12 depends on a predetermined tracking time position to track the location of the path signal around the predetermined tracking time position with a second resolution wherein the second revolution is higher than the first revolution, for example, 0.125 chip time. Then, the RAKE finger tracking units 12 acquire the tracking time positions of the path signals. The tracking time positions of the path signals are more precise than the searching time positions.

At last, all RAKE finger tracking units 12a, 12b, 12c combine the corresponding path signals 15, 17, 19 via a maximum ratio combiner (MRC) 18 to obtain the corresponding signal $S_2$ of the multipath signal 13. The signal $S_2$ comprises the largest signal-noise ratio after the aforementioned steps.

Due to the variation of the multipath signals, the predetermined tracking time position is not always suitable for the path signals 15, 17, 19, or several predetermined tracking time positions correspond to the same path signal. This means that there is any idle rake finger tracking units or several rake finger tracking units are tracking the same path signal which causes the waste and idle units in the rake receiver.

Thus, besides the three major parts, the RAKE finger management (RFM) 16 plays an important role in the RAKE receiver. The subject of the RAKE finger management 16 is to assign and manage the RAKE finger tracking units 12a, 12b, and 12c. The RAKE receiver receives the plurality of multipath signals with the limited RAKE finger tracking units. The problem needing to be solved is to bring the RAKE receiver into full play with limited resources.

SUMMARY OF THE INVENTION

The present invention provides a system for assigning a plurality of tracking units, and the RAKE receiver could be utilized most efficiently.

This present invention relates to a system for assigning a plurality of tracking units of a wireless receiver. The wireless receiver is utilized in a wireless communication system to receive a plurality of external multipath signals in a predetermined time period for reconstructing correspondingly an original signal. The plurality of tracking units track a plurality of path signals in each multipath signal according to a plurality of correspondingly predetermined tracking time positions. The invention comprises a searcher, a range estimator, and an assigning management unit.

The searcher searches the plurality of path signals in the multipath signal with a first predetermined resolution, 0.5 chip times for example, and accordingly acquires a plurality of corresponding searching time positions. The range estimator estimates the plurality of searching time positions and the first predetermined resolution via a predetermined range estimating process, and accordingly acquires a plurality of tracking ranges corresponding to the plurality of searching time positions. The assigning management unit compares a tracking range corresponding to a target searching time position of the plurality of searching time positions with the plurality of predetermined tracking time positions, and accordingly assigns the plurality of tracking units.

Wherein, if there are more than one predetermined tracking time positions within the tracking range, the assigning management unit assigns any tracking unit corresponding to one of the predetermined tracking time positions to track the path signal corresponding to the target searching time position; if there is only one predetermined tracking time position within the tracking range, the assigning management unit assigns the tracking unit corresponding to the predetermined tracking time position to track the path signal corresponding to the target searching time position; if there is no predetermined tracking time position within the tracking range, the assigning management unit assigns an idle tracking unit to track the path signal corresponding to the target searching time position according to the target searching time position corresponding to the tracking range.

According to the invention, a RAKE finger tracking unit tracks only one multipath signal. The present invention decreases the resource wastage and however, increases the efficiency of the RAKE receiver.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will become more filly understood from the detailed description given hereinbelow and the accompanying drawings which are given by way of illustration only, and thus are not limitative of the present invention, and wherein.

DETAILED DESCRIPTION OF THE INVENTION

Because of the requirement of minimization in each element of the wireless communication systems, the wireless receiver is requested to be made in a small size with complete functions to make the most effective of the hardware of the wireless receiver. This present invention provides an assigning system for making the most effective of the tracking unit of the wireless receiver rather than wasting resources. Following is the detailed description of the present invention.

Figure 1:
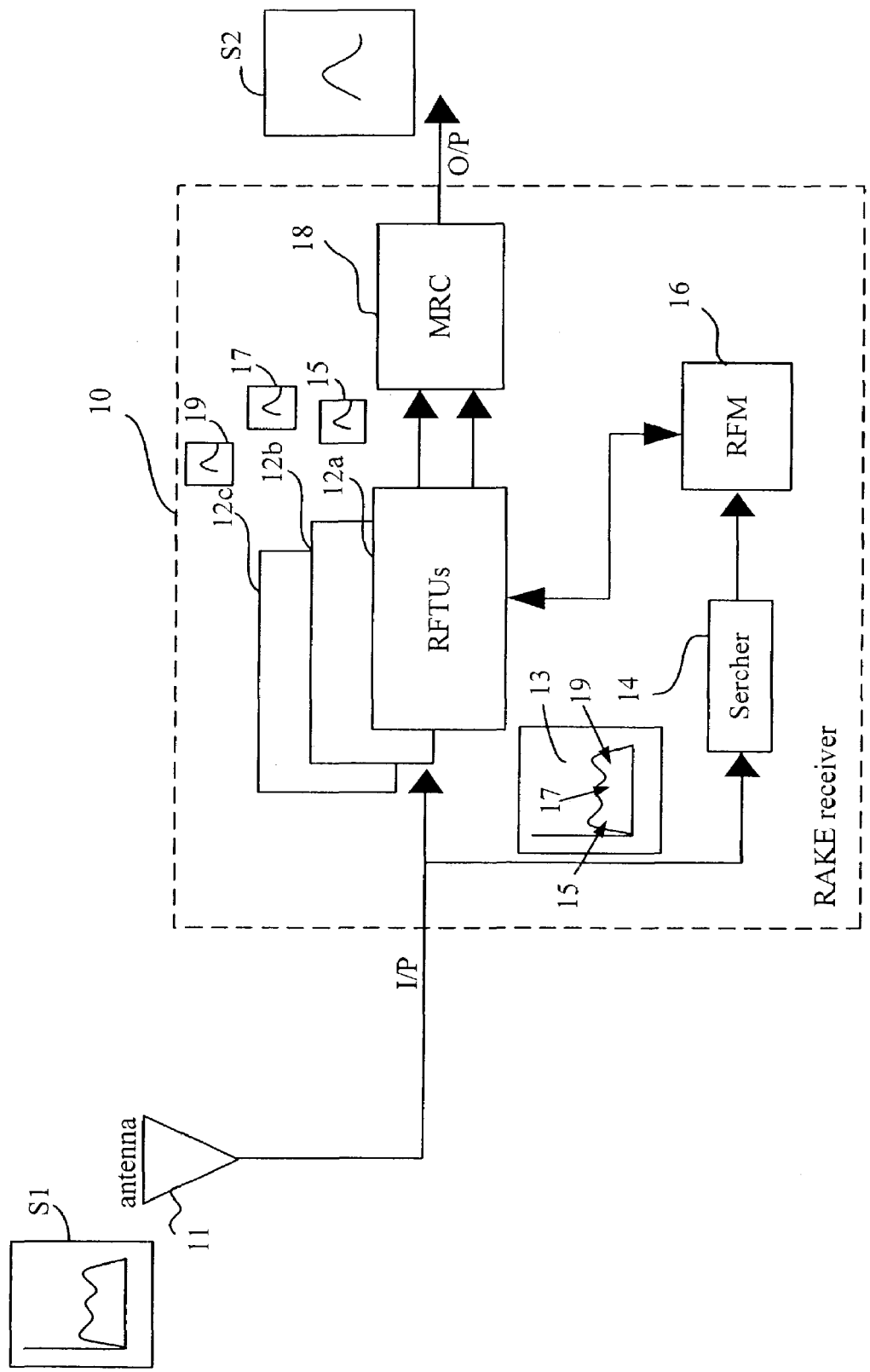
FIG. 1 is a schematic diagram of a RAKE receiver according to the prior art.
Figure 2:
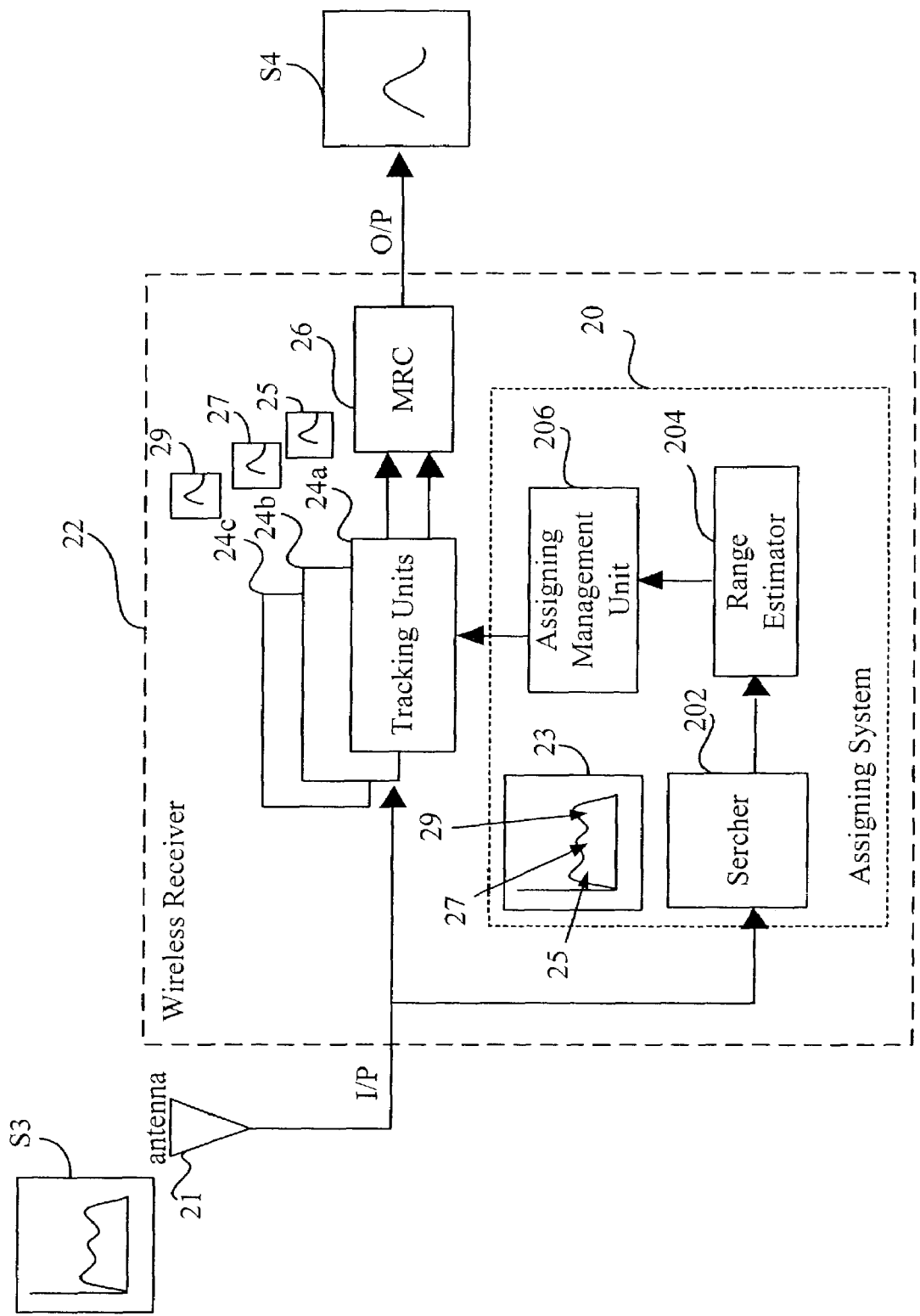
FIG. 2 is a schematic diagram of the preferred embodiment according to the present invention.

Please refer to FIG. 2. FIG. 2 is a schematic diagram of the preferred embodiment according to the present invention. The present invention provides an assigning system 20 for assigning a plurality of tracking units 24a, 24b, 24c of a wireless receiver 22, the wireless receiver 22 is utilized in a wireless communication system to receive a plurality of external multipath signals $S_3$ from an antenna 21 in a predetermined time period for reconstructing correspondingly an original signal $S_4$. Three tracking units are utilized to simplify this case, however, more units can be accommodated.

In another preferred embodiment, the wireless communication system is a CDMA communication system; the wireless receiver is a RAKE receiver; and the tracking unit is a RAKE finger tracking unit.

The assigning system 20 of the present invention comprises a searcher 202, a range estimator 204, and an assigning management unit 206. The searcher 202 searches the plurality of path signalsin the multipath signal with a first predetermined resolution, 0.5 chip time for example, and accordingly acquires a plurality of corresponding searching time positions. Three tracking units corresponding to the plurality of path signals are utilized to simplify this case, however, more units can be accommodated.

The definition of the chip time are as follows. The rake receiver receives the signal every 10 millisecond (ms). Every 10 ms is regard as a frame, and each frame is divided into 15 time slots, each time slot is divided into 2560 chip times. As a result, every second could be divided into 3.84 million chip times. The definition of chip time different from system to system. The aforementioned searcher takes 0.5 chip time as the revolution of the searching path signal.

The plurality of tracking units 24a, 24b, 24c track the time position of the plurality of corresponding path signals 25, 27, 29 in the multipath signal 23 with the plurality of correspondingly predetermined tracking time positions and a second predetermined resolution, 0.125 chip time as usual, wherein the second predetermined resolution is higher than the first resolution. The assigning system 20 comprises a maximum ratio combiner 26 for combining the plurality of path signals 25, 27, 29 in the multipath signal 23 to reconstruct the corresponding original signal $S_4$.

Wherein the searcher 202 and the tracking unit 24 track the multipath signal 23 at the same time. The searcher searches the entire multipath signal 23 to confirm the existence of the path signal. However, the tracking unit tracks the single path signal of the multipath signal 23 to acquire the position of the path signal.

The work assignment of the searcher and the tracking unit is considered by the rule of the design that the completely wireless receiver should be small and comprises complete function. The higher resolution result in the larger size and electricity consumption, the resolution of the searcher couldn't be defined too high. For acquiring the position of the path signal to obtain the optimal signal power, the searcher tracks the path signal with the tracking units. Therefore, a tracking unit could have a higher resolution, but only tracks the single path signal near by the predetermined tracking time position. Two RAKE finger tracking units track the same path signal and wastes resources if there are two predetermined tracking time positions in a path signal.

The assigning system of the present invention defines a tracking range of each path signal in a searcher, and assigns a RAKE finger tracking unit in each tracking range. This method is executed by the range estimator 204 and the assigning management unit 206 in the assigning system of the present invention.

A range estimator 204 estimates the plurality of searching time positions and the first predetermined resolution via a predetermined range estimating process, and accordingly acquires a plurality of tracking ranges corresponding to the plurality of searching time positions. Wherein the entire range estimating process will illustrate more specific in the following paragraphs.

An assigning management unit 206 compares a tracking range corresponding to a target searching time position of the plurality of searching time positions with the plurality of predetermined tracking time positions, and accordingly assigns the plurality of tracking units.

Wherein, if there are more than one predetermined tracking time positions within the tracking range, the assigning management unit 206 assigns any tracking unit corresponding to one of the predetermined tracking time positions to track the path signal corresponding to the target searching time position; if there is only one predetermined tracking time position within the tracking range, the assigning management unit assigns the tracking unit corresponding to the predetermined tracking time position to track the path signal corresponding to the target searching time position; if there is no predetermined tracking time position within the tracking range, the assigning management unit assigns an idle tracking unit to track the path signal corresponding to the target searching time position according to the target searching time position corresponding to the tracking range.

Figure 3:
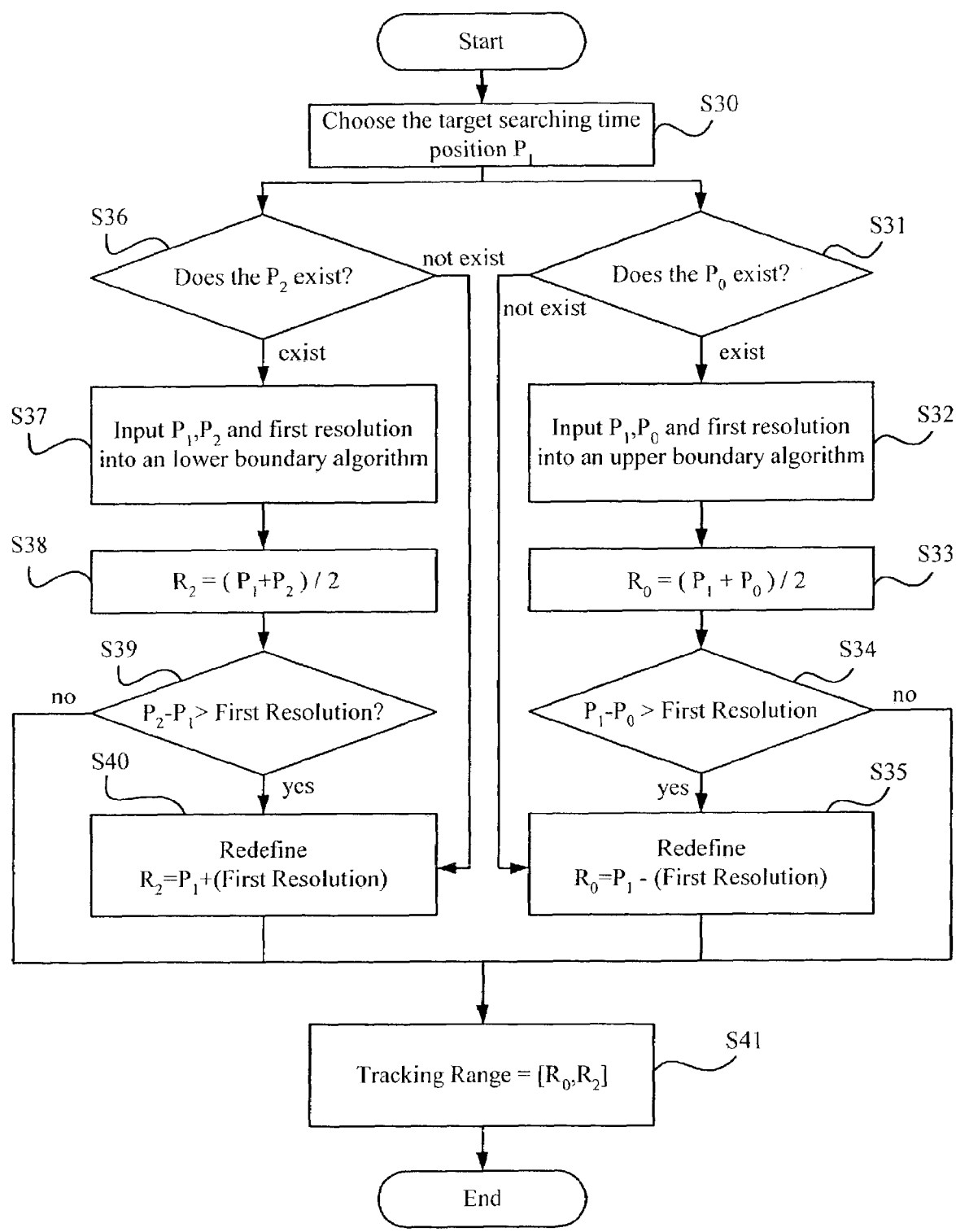
FIG. 3 is a flow chart of the range estimating process according to the present invention.
Figure 4:
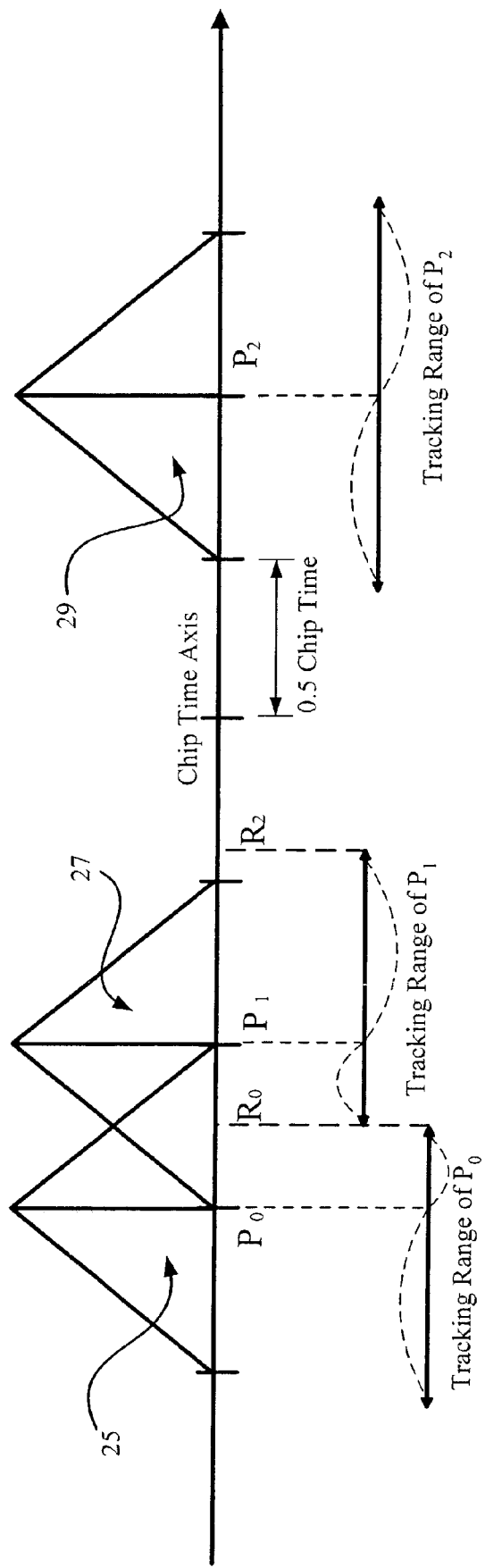
FIG. 4 is a schematic diagram of the tracking range according to the present invention.

Following are the detail of the range estimating process. Please refer to FIG. 3 and FIG. 4. FIG. 3 is a flow chart of the range estimating process according to the present invention. FIG. 4 is a schematic diagram of the tracking range according to the present invention. The predetermined range estimating process acquires the tracking range corresponding to the target searching time position $P_1$ via the following steps:

Step S30, choose the target searching time position $P_1$, and then go to Step S31 and Step S36;

Step S31, choose an adjacent preceding searching time position $P_0$; if the preceding searching time position exists, go to Step S32; if the preceding searching time position doesn't exist, go to Step S35;

Step S32, estimate the target searching time position $P_1$, the adjacent preceding searching time position $P_0$ and the first resolution via an upper boundary algorithm, and go to Step S33;

Step S33, average the sum of the target searching time position $P_1$ and the adjacent preceding searching time position $P_0$ and acquire the upper boundary coordinate $R_0$ of the tracking range, and go to Step S34;

Step S34, judge if the result of subtracting the upper boundary coordinate $P_0$ from the target searching time position $P_1$ is greater than the first resolution, If yes, go to Step S35; if no, go to Step S41;

Step S35, redefine the upper boundary coordinate $R_0$ to be the result of subtracting the first resolution from the target searching time position $P_1$, and go to Step S41;

Step S36, choose an adjacent following searching time position $P_0$; if the following searching time position exists, go to Step S37; if the following searching time position doesn't exist, go to Step S40;

Step S37, estimate the target searching time position $P_1$, the adjacent following searching time position $P_2$ and the first resolution via a lower boundary algorithm, and go to Step S38;

Step S38, average the sum of the target searching time position $P_1$ and the adjacent following searching time position $P_2$ and acquire the lower boundary coordinate $R_2$, and go to Step S39;

Step S39, judge if the result of subtracting the upper boundary coordinate $P_0$ from the target searching time position $P_1$ is greater than the first resolution, if yes, go to Step $S_{40}$; if no, go to Step S41;

Step S40, redefine the lower boundary coordinate $R_2$ to be the sum of the first resolution and the target searching time position $P_1$, and go to Step S41;

Step S41, define the tracking range corresponding to the target searching time position between the upper boundary coordinate $R_0$ and the lower boundary coordinate $R_2$.

Figure 5:
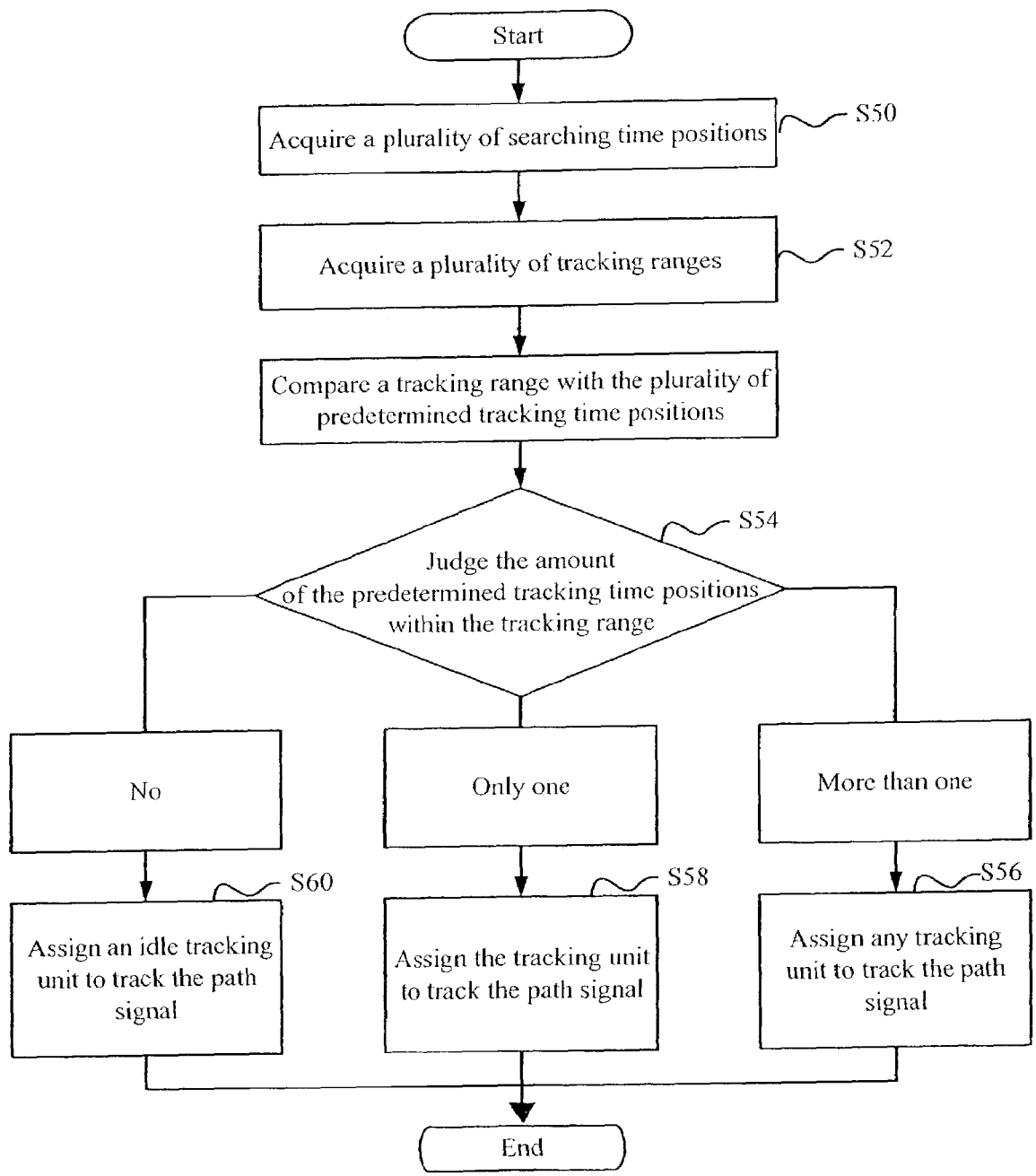
FIG. 5 is a flow chart of the assigning method according to the present invention.

The aforementioned are the introduction of the assigning system according to the present invention. The following are the detailed description of the process of the assigning method according to the present invention. Please refer to FIG. 5. FIG. 5 is a flow chart of the assigning method according to the present invention. The assigning method comprises:

Step S50, search the plurality of path signals in the multipath signal with a first predetermined resolution, and accordingly acquire a plurality of corresponding searching time positions, and go to Step S52;

Step S52, estimate the plurality of searching time positions and the first predetermined resolution via a predetermined range estimating process as FIG. 4, and accordingly acquire a plurality of tracking ranges corresponding to the plurality of searching time positions, and go to Step S54;

Step S54, compare a tracking range corresponding to a target searching time position of the plurality of searching time positions with the plurality of predetermined tracking time positions, and accordingly assigning the plurality of tracking units;

Step S55, judge the amount of the predetermined tracking time positions within the tracking range, if there are more than one predetermined tracking time positions within the tracking range, go to Step S56; if there is only one predetermined tracking time position within the tracking range, go to Step S58; if there is no predetermined tracking time position within the tracking range, go to Step S60;

Step S56, assign any tracking unit corresponding to one of the predetermined tracking time positions to track the path signal corresponding to the target searching time position;

Step S58, assign the tracking unit corresponding to the predetermined tracking time position to track the path signal corresponding to the target searching time position, and;

Step S60, assign an idle tracking unit according to the target searching time position corresponding to the tracking range to track the path signal corresponding to the target searching time position.

Here is a review for the method of the assigning system. The present invention provides an assigning system for estimating each tracking range of each path signal in a multipath signal. The assigning system compares the predetermined tracking time positions with the corresponding RAKE finger tracking units according to the tracking range, judges the amount of the tracking time position within the tracking range. Therefore, there is only one predetermined tracking time position within a tracking range.

Thus, the invention efficiently assigns a RAKE finger tracking unit within a wireless receiver without wasting the resource of hardware. Furthermore, a wireless receiver could keep in a good functionality under the plurality of a path signals.

Those skills in the art will readily observe that numerous modifications and alterations of the device may be made while retaining the teaching of the invention. Accordingly, the above disclosure should be construed as limited by the metes and bounds of the appended claims.

What is claimed is:

1. An assigning system for assigning a plurality of tracking units of a wireless receiver, the wireless receiver being utilized in a wireless communication system to receive a plurality of external multipath signals in a predetermined time period for reconstructing correspondingly an original signal, the plurality of tracking units tracking a plurality of path signals in each multipath signal according to a plurality of correspondingly predetermined tracking time positions, the assigning system comprising:

a searcher for searching the plurality of path signals in the multipath signal with a first predetermined resolution, and accordingly acquiring a plurality of corresponding searching time positions;

a range estimator for estimating the plurality of searching time positions and the first predetermined resolution via a predetermined range estimating process, and accordingly acquiring a plurality of tracking ranges corresponding to the plurality of searching time positions; and an assigning management unit for comparing a tracking range corresponding to a target searching time position of the plurality of searching time positions with the plurality of predetermined tracking time positions, and accordingly assigning the plurality of tracking units;

wherein, if there are more than one predetermined tracking time positions within the tracking range, the assigning management unit assigns any tracking unit corresponding to one of the predetermined tracking time positions to track the path signal corresponding to the target searching time position; if there is only one predetermined tracking time position within the tracking range, the assigning management unit assigns the tracking unit corresponding to the predetermined tracking time position to track the path signal corresponding to the target searching time position; if there is no predetermined tracking time position within the tracking range, the assigning management unit assigns an idle tracking unit to track the path signal corresponding to the target searching time position according to the target searching time position corresponding to the tracking range.

2. The assigning system of claim 1, wherein the wireless receiver is a rake receiver.

3. The assigning system of claim 1, wherein the tracking units is a rake finger tracking unit.

4. The assigning system of claim 1, wherein the predetermined range estimating process acquires the tracking range corresponding to the target searching time position via the following steps:

choosing the target searching time position and an adjacent preceding searching time position and an adjacent following searching time position;

estimating the target searching time position, the adjacent preceding searching time position and the first resolution via an upper boundary algorithm, and accordingly acquiring an upper boundary coordinate of the tracking range;

estimating the target searching time position, the adjacent following searching time position and the first resolution via a lower boundary algorithm, and accordingly acquiring a lower boundary coordinate of the tracking range; and defining the tracking range corresponding to the target searching time position between the upper boundary coordinate and the lower boundary coordinate.

5. The assigning system of claim 4, wherein the upper boundary algorithm acquires the upper boundary coordinate by averaging the sum of the target searching time position and the adjacent preceding searching time position; and if the result of subtracting the upper boundary coordinate from the target searching time position is greater than the first resolution, or the adjacent preceding searching time position doesn't exist, the upper boundary coordinate is redefined to be the result of subtracting the first resolution from the target searching time position.

6. The assigning system of claim 4, wherein the lower boundary algorithm acquires the lower boundary coordinate by averaging the sum of the target searching time position and the adjacent following searching time position; and if the result of subtracting the target searching time position from the lower boundary coordinate is greater than the first resolution, or the adjacent following searching time position doesn't exist, the lower boundary coordinate is redefined to be the sum of the first resolution and the target searching time position.

7. The assigning system of claim 1, wherein the plurality of tracking units track the plurality of corresponding path signals in the multipath signal according to the plurality of corresponding predetermined tracking time positions and a second predetermined resolution wherein the second predetermined resolution is higher than the first predetermined resolution.

8. The assigning system of claim 1, wherein the assigning system comprises a maximum ratio combiner for combine the plurality of path signals in the multipath signal to reconstruct the corresponding original signal.

9. An assigning system for assigning a plurality of tracking units of a wireless receiver, the wireless receiver being utilized in a wireless communication system to receive a plurality of external multipath signals in a predetermined time period for reconstructing correspondingly an original signal, the plurality of tracking units tracking a plurality of path signals in each multipath signal according to a plurality of corresponding predetermined tracking time positions, the assigning system comprising:

searching the plurality of path signals in the multipath signal with a first predetermined resolution, and accordingly acquiring a plurality of corresponding searching time positions;

estimating the plurality of searching time positions and the first predetermined resolution via a predetermined range estimating process, and accordingly acquiring a plurality of tracking ranges corresponding to the plurality of searching time positions; and comparing a tracking range corresponding to a target searching time position of the plurality of searching time positions with the plurality of predetermined tracking time positions, and accordingly assigning the plurality of tracking units;

assigning any tracking unit corresponding to one of the predetermined tracking time positions, if there are more than one predetermined tracking time positions within the tracking range, to track the path signal corresponding to the target searching time position;

assigning the tracking unit corresponding to the predetermined tracking time position, if there is only one predetermined tracking time position within the tracking range, to track the path signal corresponding to the target searching time position; and assigning an idle tracking unit, if there is no predetermined tracking time position within the tracking range, to track the path signal corresponding to the target searching time position according to the target searching time position corresponding to the tracking range.

10. The assigning system of claim 9, wherein the wireless receiver is a rake receiver.

11. The assigning system of claim 9, wherein the tracking units is a rake finger tracking unit.

12. The assigning system of claim 9, wherein the predetermined range estimating process acquires the tracking range corresponding to the target searching time position via the following steps:

choosing the target searching time position and an adjacent preceding searching time position and an adjacent following searching time position;

estimating the target searching time position, the adjacent preceding searching time position and the first resolution via an upper boundary algorithm, and accordingly acquiring an upper boundary coordinate of the tracking range;

estimating the target searching time position, the adjacent following searching time position and the first resolution via a lower boundary algorithm, and accordingly acquiring a lower boundary coordinate of the tracking range; and defining the tracking range corresponding to the target searching time position between the upper boundary coordinate and the lower boundary coordinate.

13. The assigning system of claim 12, wherein the upper boundary algorithm acquires the upper boundary coordinate by averaging the sum of the target searching time position and the adjacent preceding searching time position; and if the result of subtracting the upper boundary coordinate from the target searching time position is greater than the first resolution, or the adjacent preceding searching time position doesn't exist, the upper boundary coordinate is redefined to be the result of subtracting the first resolution from the target searching time position.

14. The assigning system of claim 12, wherein the lower boundary algorithm acquires the lower boundary coordinate by averaging the sum of the target searching time position and the adjacent following searching time position; if the result of subtracting the target searching time position form the lower boundary coordinate is greater than the first resolution, or the adjacent following searching time position doesn't exist, the lower boundary coordinate is redefined to be the sum of the first resolution and the target searching time position.

15. The assigning system of claim 9, wherein the wireless receiver comprises a searcher for searching the plurality of path signals in the multipath signal with a first predetermined resolution, and accordingly acquiring a plurality of corresponding searching time positions.

16. The assigning system of claim 9, wherein the wireless receiver comprises a range estimator for estimating the plurality of searching time positions and the first predetermined resolution via a predetermined range estimating process, and accordingly acquiring a plurality of tracking ranges corresponding to the plurality of searching time positions.

17. The assigning system of claim 9, wherein the wireless receiver comprises a assigning management unit for comparing a tracking range corresponding to a target searching time position of the plurality of searching time positions with the plurality of predetermined tracking time positions, and accordingly assigning the plurality of tracking units.

18. The assigning system of claim 9, wherein the plurality of tracking units track the plurality of corresponding path signal in the multipath signal according to the plurality of corresponding predetermined tracking time position and a second predetermined resolution wherein the second predetermined resolution is higher than the first predetermined resolution.

19. The assigning system of claim 9, wherein the assigning system comprises a maximum ratio combiner for combining the plurality of path signals in the multipath signal to reconstruct the corresponding original signal.

* * * * *